United States Patent [19]
Aoki et al.

[11] Patent Number: 5,786,981
[45] Date of Patent: Jul. 28, 1998

[54] BASIC CELL FOR AN ELECTRIC DOUBLE LAYER CAPACITOR

[75] Inventors: Munekazu Aoki; Masako Inagawa; Keitaro Katsu, all of Tokyo, Japan

[73] Assignee: NEC Corporation, Tokyo, Japan

[21] Appl. No.: 808,959

[22] Filed: Feb. 19, 1997

[30] Foreign Application Priority Data

Feb. 19, 1996 [JP] Japan ................... 8-030872

[51] Int. Cl.⁶ ........................... H01G 9/00
[52] U.S. Cl. ................. 361/502; 361/504; 361/512; 361/520; 361/525; 361/538
[58] Field of Search ............... 361/500, 502, 361/503, 504, 508, 511, 512, 516, 520, 522, 523, 525, 528, 532, 538; 429/190, 7, 122, 218; 204/412, 294; 29/25.03, 25.42, 623.1, 623.5

[56] References Cited

U.S. PATENT DOCUMENTS

| | | | |
|---|---|---|---|
| 3,634,736 | 1/1972 | Boss et al. | 361/502 |
| 3,648,126 | 3/1972 | Boss et al. | 361/502 |
| 5,121,301 | 6/1992 | Kurabayashi et al. | 361/502 |
| 5,142,451 | 8/1992 | Kurabayashi et al. | 361/502 |
| 5,419,977 | 5/1995 | Weiss et al. | 429/7 |
| 5,455,999 | 10/1995 | Weiss et al. | 29/623.1 |

FOREIGN PATENT DOCUMENTS

| | | |
|---|---|---|
| 4-288361 | 10/1992 | Japan . |
| 6-7539 | 1/1994 | Japan . |
| 7-48464 | 5/1995 | Japan . |

*Primary Examiner*—Kristine L. Kincaid
*Assistant Examiner*—Anthony Dinkins
*Attorney, Agent, or Firm*—Sughrue, Mion, Zinn, Macpeak & Seas, PLLC

[57] ABSTRACT

A basic cell for an electric double layer capacitor has a pair of polarizing electrodes each including a plurality of chip electrodes arranged in matrix or honeycomb pattern. The plurality of chip electrodes are electrically connected by direct contact between each adjacent two chip electrodes for increasing the capacitance and decreasing the internal resistance. Excellent charging or discharging characteristic can be obtained even if the sheet collectors for providing charging or discharging current for the chip electrodes have different specific resistivities along the surface of the sheet collectors. The chip electrodes may be of a truncated pyramid shape for improving resistance against distorting or bending stress applied to the basic cell.

25 Claims, 4 Drawing Sheets

BASIC CELL FOR AN ELECTRIC DOUBLE LAYER CAPACITOR

BACKGROUND OF THE INVENTION (a) Field of the Invention

The present invention relates to a basic cell for an electric double layer capacitor and, more particularly, to a basic cell for an electric double layer capacitor having a large capacitance and an excellent resistance against a distorting or bending stress.

(b) Description of the Related Art

An electric double layer capacitor has advantages of a larger capacitance as compared to an aluminum electrolytic capacitor and of a simpler configuration as compared to a secondary battery using charge and discharge circuits. The electric double layer capacitor has been generally used for backup of a memory in an electronic device and for driving a motor or actuator during a short time interruption of electric power. For such a use, current in several tens of micro-ampere to several hundreds of milli-ampere is generally derived from the electric double layer capacitor.

Recently, in addition to the above uses, it is proposed that the electric double layer capacitor be combined with a secondary cell in a hybrid equipment for regenerative braking of a vehicle such as a motor car, electric car and elevator. In the proposed arrangement, a high power density is provided by the electric double layer capacitor and a high energy density is provided by the secondary cell to thereby improve the total energy efficiency in the vehicle.

The electric double layer capacitor is generally fabricated by connecting two or more basic cells in series to obtain a desired withstand voltage, or it may be composed of a single basic capacitor. It is requested in the electric double layer capacitor to improve the performance thereof by increasing the electric capacitance and decreasing the internal resistance of the basic cell.

A conventional basic cell in an electric double layer capacitor has a pair of polarizing electrodes, wherein activated carbon electrodes having a large surface area are made by mixing activated powdery carbon with an electrolyte to form a paste material or by impregnating activated fibrous carbon with an electrolyte.

Recently, solid polarizing electrodes having an improved performance are made by using a sintered body of activated carbon in order to increase the capacitance per unit area of the polarizing electrodes and to decrease the internal resistance of the basic cell. Solid polarizing electrodes are also made from a composite material containing activated carbon and a polyacene, to further improve the performance, wherein a fast charge of the basic cell can be obtained by flowing charging current in several to a thousand amperes, as described in Patent Publication No. JP-A-4(1992)-288361.

The composite material of activated carbon/polyacen can be obtained by thermosetting a mixture of activated powdery or fibrous carbon with powdery or granular phenolic resin and by a subsequent heat treatment of the same in a non-oxidizing ambient.

With an electric double layer capacitor of the type as described above, basic cells are connected in series to form an electric double layer capacitor having a desired dielectric withstand voltage. The dielectric withstand voltage of the basic cell generally remains around 1.0 volt when an aqueous electrolyte is used, whereas the dielectric withstand voltage rises up to 2 or 3 volts when an organic electrolyte is used.

When a high power density is requested in the electric double layer capacitor, a large number of basic cells having a large capacity are connected in series to obtain a high withstand voltage and a large capacitance for the capacitor. As the number of the basic cells connected in series increases, however, the capacitor will have a lower capacitance and a higher internal resistance compared to an expected values. To prevent the decrease in the capacitance and increase in the internal resistance, it may be considered to employ a large surface area of the solid polarizing electrodes in the basic cell. However, the solid polarizing electrode is susceptible to destruction due to lack of strength.

To increase the surface area of the solid polarizing electrodes without destruction, each of Patent Publications No. JP-B-7(1994)-48464 and No. JP-B-6(1993)-7539 discloses a basic cell having a pair of solid polarizing electrodes. FIGS. 1 and 2 show a plan view and a cross-sectional view taken along line C—C in FIG. 1, respectively, of the arrangement of the chip electrodes in the basic cell disclosed in JP-B-7-48464, and FIG. 3 shows a cross-section of the final basic cell taken along line C—C in FIG. 1.

The basic cell comprises a first sheet collector 13a having a rectangular shape, a gasket 12 disposed at the periphery of the first collector 12, and a plurality of first layer polarizing electrode assembly including a plurality of square chip electrodes 22a impregnated with an electrolyte and arranged in a matrix on the first sheet collector 13a and in spaced relationship with one another. The basic cell further comprises a porous separator 16 having a rectangular shape and covering the first layer of chip electrodes 22a, a second layer polarizing electrode assembly including a plurality of chip electrodes 22b disposed on the porous separator 16 in opposed relationship with the respective first layer chip electrodes 22a, and a second sheet collector 13b on the second layer chip electrodes 22b. The sheet collectors 13a and 13b and the gasket 12 form a housing for enclosing the electrode assemblies 22a and 22b and the porous separator 16.

JP-B-6-7539 discloses a similar basic cell wherein a paste conductive mixture of activated powdery carbon and an electrolyte is filled in the spaces between the chip electrodes of the first and second layer polarizing electrodes.

In the basic cell disclosed in JP-B-7-48464, the sheet collectors 13a and 13b are generally made by dispersing carbon filler in butyl rubber to have an electric conductivity. We found that the sheet collector has an uneven specific resistivity along the surface thereof due to uneven dispersion of the filler. Accordingly, the chip electrodes disposed on a portion of the sheet collector having a higher specific resistivity require a large length of time for charging or discharging of the chip electrodes to degrade the charging and discharging characteristics of the electric double layer capacitor.

In the basic cell disclosed in JP-B-6-7539, although the paste conductive mixture is filled in the spaces between the chip electrodes, similar degradation of the charging and discharging characteristics is involved therein because the paste conductive mixture has a higher specific resistivity unless the paste conductive mixture is subject to a sufficient pressure to well contact the particles together in the activated powdery carbon. It is difficult, however, to provide a sufficient pressure to the activated powdery carbon during or after fabrication of the basic cell.

Further, the basic cell portion formed by the electrode portion made of the paste conductive mixture has a low capacitance per unit area, which is as low as a half that formed by the chip electrodes, which generally lowers the capacitance of the resultant basic cell.

SUMMARY OF THE INVENTION

In view of the above, it is an object of the present invention to improve the basic cell for use in an electric double layer capacitor to provide an improved electric double layer capacitor having a large electric capacitance per unit area and a low internal resistance and exhibiting improved charging or discharging characteristics.

According to the present invention, there is provided a basic cell for an electric double layer capacitor having a first sheet collector, a first polarizing electrode including a plurality of chip electrodes arranged on the first sheet collector, an insulating separator covering the chip electrodes, a second polarizing electrode including a plurality of chip electrodes arranged on the insulating separator in opposed relationship with the plurality of chip electrodes of the first polarizing electrode, and a second sheet collector disposed on the second polarizing electrode, wherein the chip electrodes in each of the first and second polarizing electrodes are electrically connected together by a direct contact between each adjacent two of the chip electrodes.

In accordance with the present invention, the basic cell has a large capacitance and a low internal resistance, and exhibits a high resistance against a distorting or bending stress.

The above and other objects, features and advantages of the present invention will be more apparent from the following description, referring to the accompanying drawings, wherein similar constituent elements are designated by the same or related reference numerals throughout the drawings.

DESCRIPTION OF THE PREFERRED EMBODIMENTS

Figure 1:
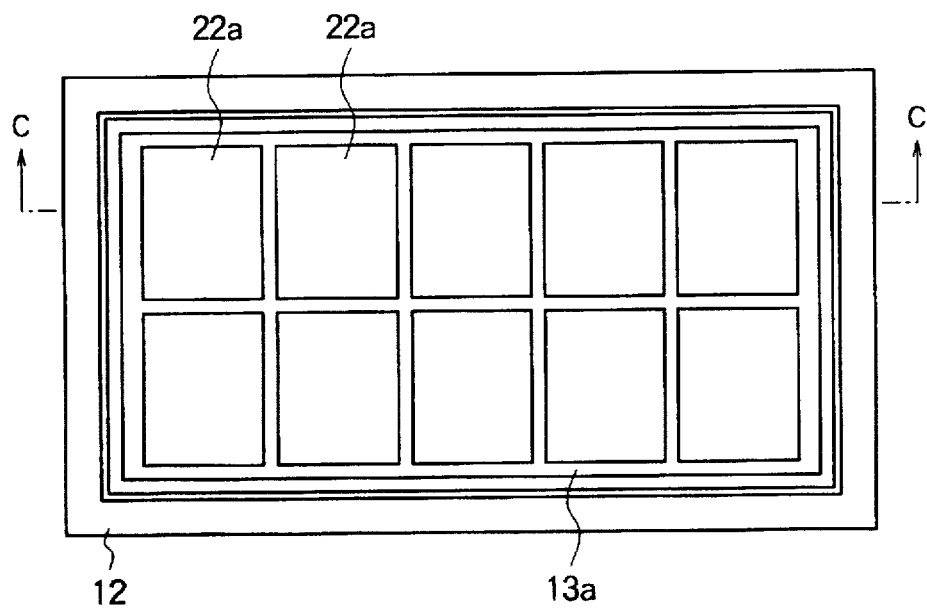
FIG. 1 is a plan view of a conventional basic cell for an electric double layer capacitor in a step of fabrication thereof.
Figure 2:
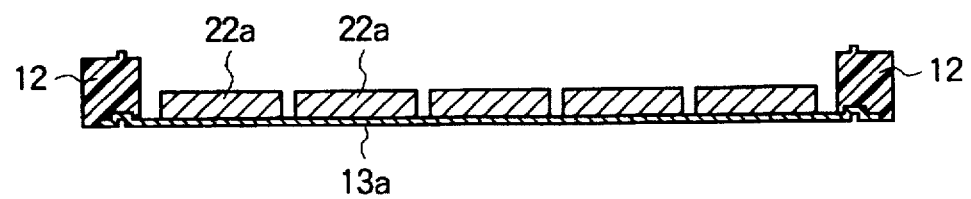
FIG. 2 is a cross-sectional view taken along line C—C in FIG. 1.
Figure 3:
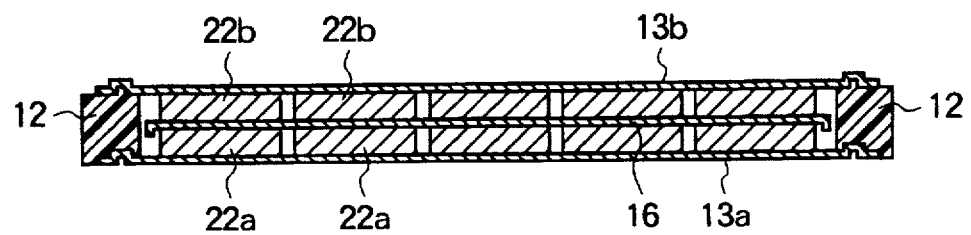
FIG. 3 is a cross-sectional view of the basic cell of FIG. 1 in a finished state, taken along line C—C in FIG. 1.
Figure 4:
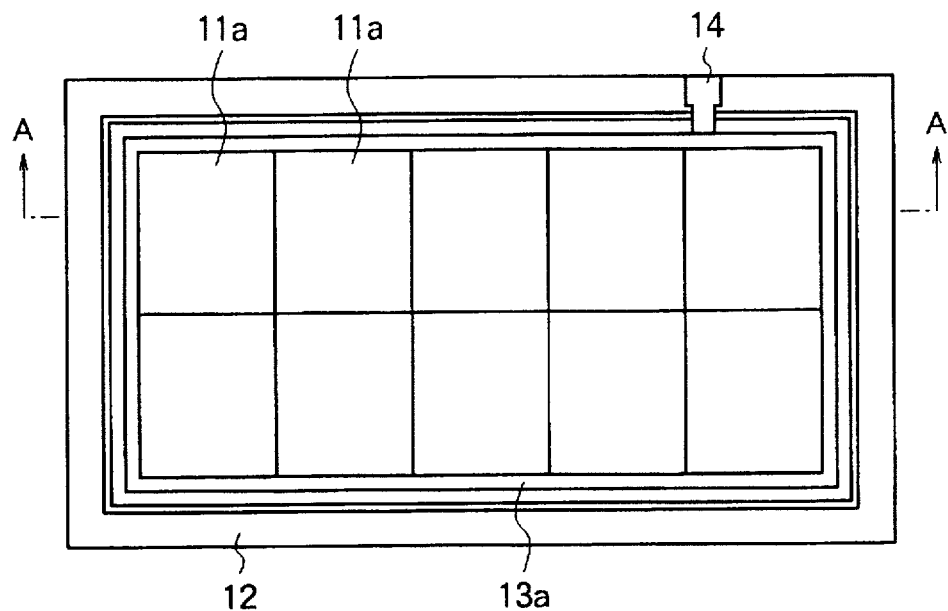
FIG. 4 is a plan view of a basic cell, for use in an electric double layer capacitor, according to an embodiment of the present invention in a step of fabrication.
Figure 5:
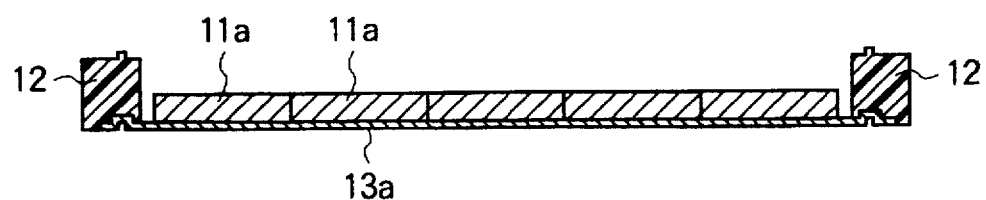
FIG. 5 is a cross-sectional view taken along line A—A in FIG. 4.
Figure 6:
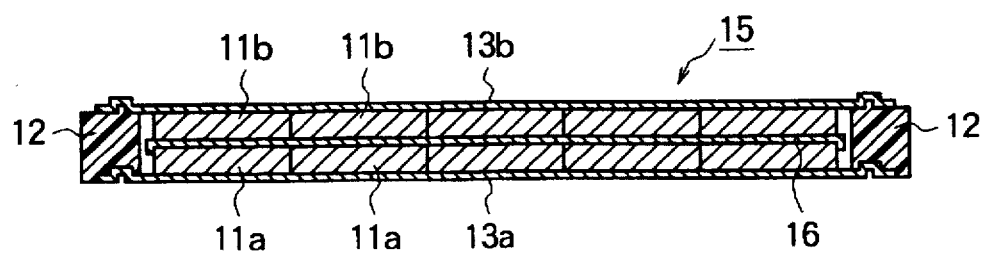
FIG. 6 is a cross-sectional view of the basic cell of FIG. 4 in a finished state, taken along line A—A in FIG. 4.

FIGS. 4 to 6 show, similarly to FIGS. 1 to 3, a basic cell for an electric double layer capacitor according to a first embodiment. As shown in FIGS. 4 and 5, the basic cell 15 comprises a first sheet collector 13a having a rectangular shape, a gasket 12 disposed at the periphery of the first sheet collector 12, and a first layer polarizing electrode assembly including a plurality of rectangular chip electrodes 11a impregnated with an electrolyte and arranged in a matrix on the first sheet collector 13a.

The basic cell 15 further comprises, as shown in FIG. 6, a porous separator 16 having a rectangular shape and covering the first layer chip electrodes 11a, a second layer polarizing electrode assembly including a plurality of chip electrodes 11b having configurations similar to those of first layer chip electrodes and disposed on the porous separator 16 in opposed relationship with the respective first layer chip electrodes 11a, and a second sheet collector 13b disposed on the second layer chip electrodes 11b.

Figure 11:
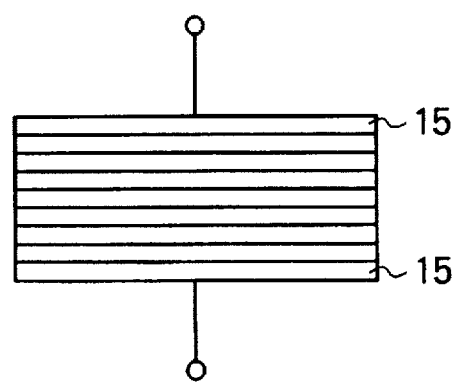
FIG. 11 is a side view of an electric double layer capacitor according to an embodiment of the present invention.

The peripheries of the first and second sheet collectors 13a and 13b are adhered to the respective sides of the gasket 12 for enclosing therein the first and second layer chip electrodes 11a and 11b and the porous separator 16, thereby forming the final structure of the basic cell 15 shown in FIG. 6. A desired number of basic cells 15 are stacked, as shown in FIG. 11, for a serial connection of the basic cells 15 to form an electric double layer capacitor having a specified dielectric withstand voltage. An electrolyte similar to the electrolyte impregnated into the chip electrodes 11a and 11b is then introduced to the basic cells through respective inlets 14 shown in FIG. 4. The inlets 14 are then sealed by plugs or high-molecular films for allowing selective penetration of particular gas or gases.

Each of the chip electrodes 11a and 11b is disposed in direct contact with adjacent chip electrodes at the side surfaces of the chip electrode. The chip electrodes 11a and 11b are preferably made of solid activated carbon containing activated carbon/phenolic composite material, wherein any binder and suitable process can be used for combining the activated powdery carbon and phenolic resin to form a sintered activated carbon of a block shape. Suitable electrolytes include sulfuric acid, such as 30 wt. % dilute sulfuric acid.

Suitable materials for the gasket 12 can be selected from insulators having a resistance to sulfuric acid and heat, such as a plastic insulator, e.g. a heat-resistant ABS resin. The first and second sheet collectors 13a and 13b are preferably made from a conductive sheet obtained as by introducing or dispersing carbon filler or powdery carbon into butyl rubber to provide a conductivity to the butyl rubber. The porous separator 16 may be made of an insulator film having a characteristic for allowing penetration of ions, such as a glass fibrous separator film used in a lead acid battery.

When 30 wt. % dilute sulfuric acid is used as an electrolyte in the basic cell of FIG. 6, the basic cell has a dielectric withstand voltage of about 1.2 volts which corresponds to the electrolysis voltage of water.

In operation, the electric double layer capacitor having the basic cells 15 as described above has an excellent charging and discharging characteristics even if the sheet collectors 13a and 13b have different specific resistivities along the surface thereof, because of the electrical contact between adjacent side surfaces of the chip electrodes. That is, the charging and discharging current for the capacitor mostly flows through a low resistivity portion of the collector having a low specific resistivity to thereby decrease the voltage drop especially at the initial stage of a charging or discharging operation.

The polarizing electrode assembly including the chip electrodes 11a and 11b disposed in direct contact with one another has an excellent volume efficiency for the capacitor because of the large opposed surfaces of the polarizing electrodes per unit area. Further, even when the sheet collectors 13a and 13b are subject to a pressure, the relatively planar surface of the electrode assembly prevents the sheet collectors 13a and 13b from being sheared by the edges of the chip electrodes 11a and 11b or from extruding to the spaces between the chip electrodes 11a and 11b.

Figure 7:
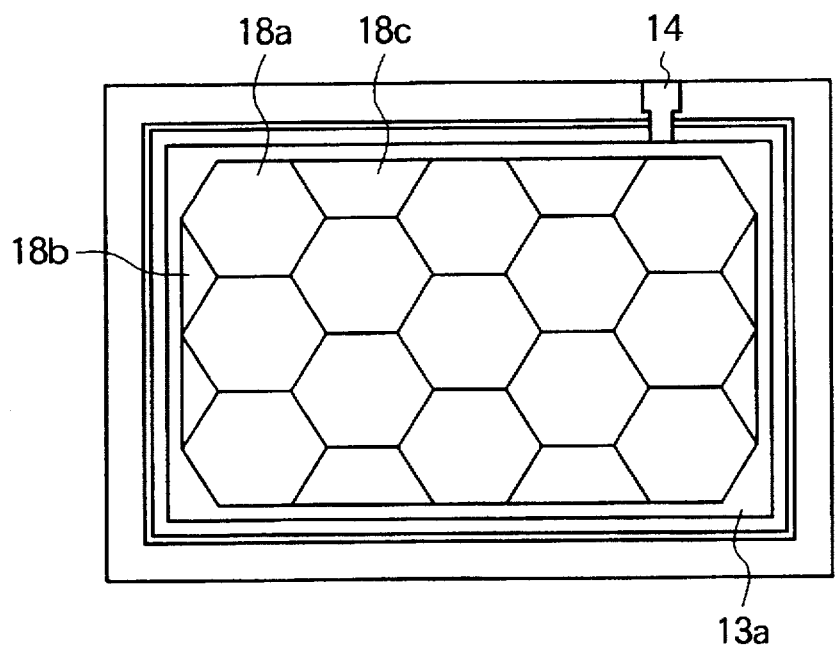
FIG. 7 is a plan view of a basic cell, for use in an electric double layer capacitor, according to a second embodiment of the present invention in a step of fabrication.

FIG. 7 shows another arrangement of chip electrodes in a basic cell, for use in an electric double layer capacitor, according to a second embodiment of the present invention. Each of the chip electrodes 18a, 18b and 18c in the first and second polarizing electrodes has a configuration of hexagon (18a), triangle (18b) or trapezoid (18c), and the chip electrodes are arranged as a whole in a honeycomb pattern, as viewed perpendicular to the sheet collector. Each of the side surfaces of each chip electrode is in direct contact with adjacent side surfaces of the adjacent chip electrodes. Other configurations are similar to those of the first embodiment and will not be specifically described here for avoiding a duplication.

Figure 8:
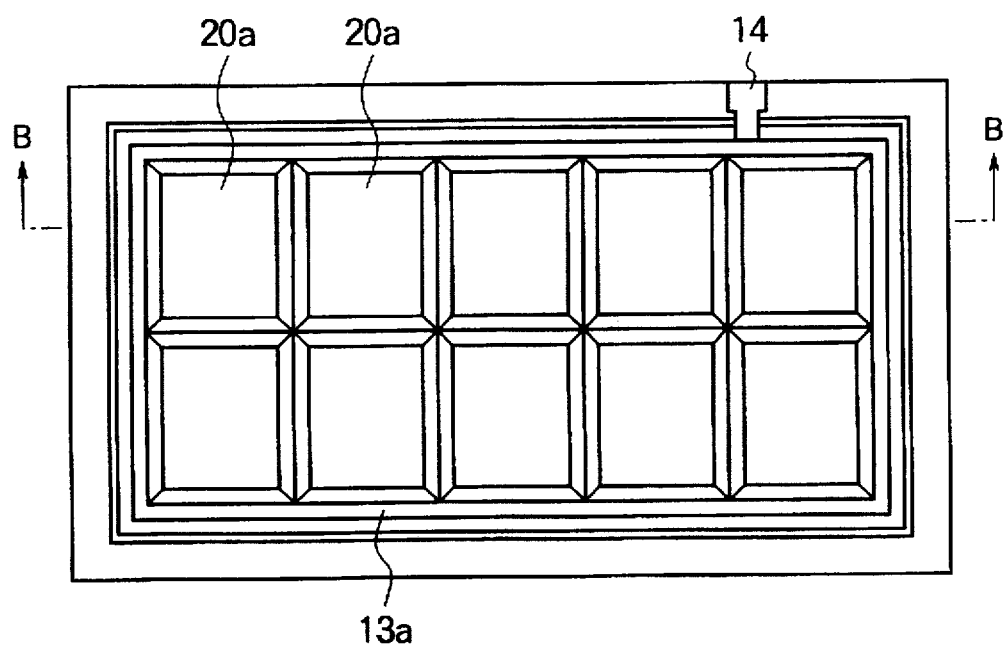
FIG. 8 is a plan view of a basic cell, for use in an electric double layer capacitor, according to a third embodiment of the present invention in a step of fabrication.
Figure 9:
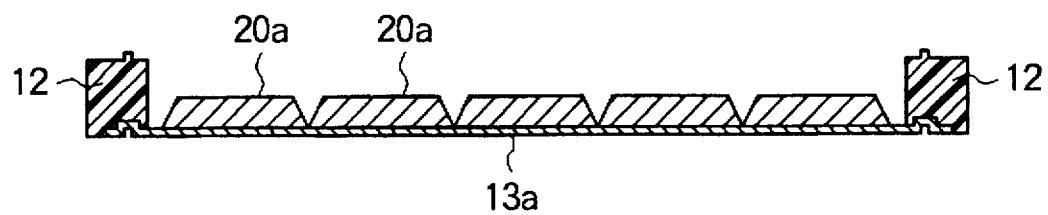
FIG. 9 is a cross-sectional view taken along line B—B in FIG. 8.
Figure 10:
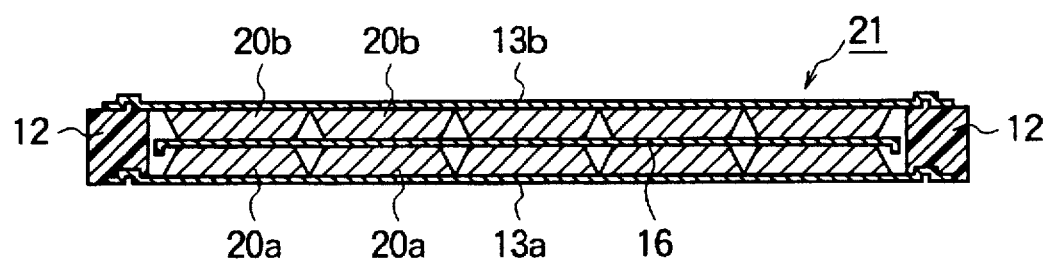
FIG. 10 is a cross-sectional view of the basic cell of FIG. 8 in the finished state, taken along line B—B in FIG. 8.

FIGS. 8 to 10 show, similarly to FIGS. 4 to 6, another basic cell, for an electric double layer capacitor, according to a third embodiment of the present invention. The basic cell has configurations similar to those of the first embodiment except that the chip electrodes 20a and 20b in the basic cell of FIGS. 8 to 10 is of a truncated pyramid. The truncated pyramid of each chip electrodes 20a and 20b has a rectangular base surface in contact with the sheet collector 13a and 13b and a rectangular top surface in contact with the porous separator 16, the base surface is slightly larger than the top surface in size. Each side of the bases of the chip electrodes 20a and 20b is in direct contact with the adjacent side of the base of the adjacent chip electrodes. The inclined angle of the side surfaces of the truncated pyramids with respect to the base surfaces is preferably between 45 and 80 degrees. The spaces between adjacent side surfaces of the chip electrodes is filled with an electrolyte.

The spaces between adjacent side surfaces of the chip electrodes 20a and 20b provides protection of the chip electrodes against a distorting or bending stress applied thereto from outside the basic cell, although the spaces between the side surfaces slightly reduces electric capacitance per unit area compared to the first embodiment. The shape of the top and base surfaces of the chip electrode may be of hexagon instead, to form a honeycomb configuration of the polarizing electrode as a whole, similarly to the case of the second embodiment.

In the above embodiments, a surface contact or line contact is employed between the adjacent sides of the chip electrodes. However, a point contact alone or combined with the surface contact or line contact may be employed as well for improving the charging and discharging capability of the capacitor.

The basic cells according to the described embodiments and conventional one were fabricated for comparison. All capacitors thus fabricated had an equal area for the chip electrodes. The capacitors were first charged by a constant voltage of 1.0 volt for 12 hours, then discharged at a constant current of 20 amperes. The basic cells according to the embodiments exhibited about 10% of improvement compared to the conventional one. At other constant currents more than 10A, the basic cells according to the embodiments also exhibited an excellent discharging characteristic. The reason was considered to be due to an even current along the surfaces of the sheet collectors provided by the configuration of the chip electrodes.

Although the present invention is described with reference to preferred embodiments thereof, the present invention is not limited thereto and various modifications or alterations can be easily made from the embodiments by those skilled in the art without departing from the scope of the present invention as set forth in the appended claims.

What is claimed is:

1. In a basic cell for an electric double layer capacitor, said basic cell having a first sheet collector, a first polarizing electrode including a plurality of chip electrodes arranged on said first sheet collector, an insulating separator covering said chip electrodes, a second polarizing electrode including a plurality of chip electrodes arranged on said insulating separator in opposed relationship with the plurality of chip electrodes of said first polarizing electrode, and a second sheet collector disposed on said second polarizing electrode, the improvement comprising an arrangement of said chip electrodes in each of said first and second polarizing electrodes such that said chip electrodes are electrically connected together by a direct contact between each adjacent two of said chip electrodes.

2. A basic cell as defined in claim 1, wherein said direct contact is effected between side surfaces of said each adjacent two of said chip electrodes.

3. A basic cell as defined in claim 1, wherein each of said chip electrodes is shaped as a rectangular prism.

4. A basic cell as defined in claim 1, wherein said chip electrodes are arranged as a whole in a honeycomb pattern.

5. An electric double layer capacitor comprising a plurality of basic cells as defined in claim 1.

6. The electric double layer capacitor as claimed in claim 5, wherein said basic cells are connected in series.

7. The basic cell as claimed in claim 1, wherein said chip electrodes arranged on said first sheet collector are made of solid activated carbon.

8. In a basic cell for an electric double layer capacitor, said basic cell having a first sheet collector, a first polarizing electrode including a plurality of chip electrodes arranged on said first sheet collector, an insulating separator covering said chip electrodes, a second polarizing electrode including a plurality of chip electrodes arranged on said insulating separator in opposed relationship with the plurality of chip electrodes of said first polarizing electrode, and a second sheet collector disposed on said second polarizing electrode, the improvement comprising an arrangement of said chip electrodes in each of said first and second polarizing electrodes such that said chip electrodes are electrically connected together by a direct contact between each adjacent two of said chip electrodes, wherein the improvement further comprises each of said chip electrodes is of a truncated pyramid shape having a top surface in contact with said separator and a bottom surface in contact with one of said first and second sheet collectors, wherein said direct contact is effected by a contact between bottom surfaces of said each adjacent two of said chip electrodes at the peripheries of the bottom surfaces.

9. The basic cell as claimed in claim 8, wherein the angle of inclination of the sides of the pyramid shape with respect to a base surface for each of said chip electrodes is between 45° and 80°.

10. A double layer capacitor comprising at least one basic cell, wherein said at least one basic cell comprises:
a first sheet collector; and
a first polarizing electrode which includes a first plurality of chip electrodes that are arranged on said first sheet collector such that said chip electrodes are electrically connected together by a direct contact between each adjacent two of said chip electrodes, wherein said chip electrodes are comprised of substantially the same material.

11. The double layer capacitor as claimed in claim 10, wherein said at least one basic cell further comprises:

an insulating separator covering said first plurality of chip electrodes; and a second polarizing electrode which includes a second plurality of chip electrodes arranged on said insulating separator, wherein said second plurality of chip electrodes is arranged in opposed relationship with said first plurality of chip electrodes.

12. The double layer capacitor as claimed in claim 11, wherein said at least one basic cell further comprises:

a second sheet collector disposed on said second polarizing electrode.

13. The double layer capacitor as claimed in claim 11, wherein either said first or said second plurality of chip electrodes is impregnated with an electrolyte.

14. The double layer capacitor as claimed in claim 13, wherein said electrolyte includes sulfuric acid.

15. The double layer capacitor as claimed in claim 13, further comprising an electrolyte within said at least one basic cell.

16. The double layer capacitor as claimed in claim 15, wherein a composition of said electrolyte within said at least one basic cell is substantially similar to that of said electrolyte impregnated in either said first or said second plurality of chip electrodes.

17. The double layer capacitor as claimed in claim 16, wherein said electrolyte within said at least one basic cell, and said electrolyte impregnated in either said first or said second plurality of chip electrodes, each contain sulfuric acid.

18. The double layer capacitor as claimed in claim 11, wherein said second plurality of chip electrodes is arranged on said second sheet collector such that said second plurality of chip electrodes is electrically connected together by a direct contact between each adjacent two of said second plurality of chip electrodes.

19. The double layer capacitor as claimed in claim 18, wherein said second plurality of chip electrodes is made from substantially the same material as said first plurality of chip electrodes.

20. The double layer capacitor as claimed in claim 19, wherein said material from which said first and said second plurality of chip electrodes are made contains carbon.

21. The double layer capacitor as claimed in claim 10, wherein said first plurality of chip electrodes is made of solid activated carbon.

22. The double layer capacitor as claimed in claim 21, wherein said solid activated carbon contains an activated carbon/phenolic composite material.

23. The double layer capacitor as claimed in claim 10, wherein said first plurality of chip electrodes is made of sintered activated carbon.

24. The double layer capacitor as claimed in claim 11, further comprising a plurality of basic cells.

25. The double layer capacitor as claimed in claim 24, wherein said basic cells are connected in series.

* * * * *